United States Patent [19]

Carlebach

[11] Patent Number: 5,608,822
[45] Date of Patent: Mar. 4, 1997

[54] APPARATUS AND METHOD FOR GENERATING HALF-TONE DOT IN IMAGE REPRODUCTION

[75] Inventor: Ephraim E. Carlebach, Ra'anana, Israel

[73] Assignee: Scitex Corporation Ltd., Herzliya, Israel

[21] Appl. No.: 276,552

[22] Filed: Jul. 18, 1994

[30] Foreign Application Priority Data

Jul. 19, 1993 [IL] Israel ......................................... 106400

[51] Int. Cl.$^6$ ............................................. G06K 9/38
[52] U.S. Cl. .......................... 382/270; 358/457; 358/466; 358/535
[58] Field of Search ..................... 358/534, 535, 358/536, 456, 457, 459, 454, 533, 298, 466; 382/270

[56] References Cited

U.S. PATENT DOCUMENTS 4,340,912  7/1982  Troxel ........................ 358/283
4,456,924  6/1984  Rosenfeld ........................ 358/75
4,825,298  4/1989  Ikuta et al. ........................ 358/298
4,918,622  4/1990  Granger et al. ........................ 364/518

FOREIGN PATENT DOCUMENTS

2157119  3/1985  United Kingdom ............. H04N 1/00

*Primary Examiner*—Joseph Mancuso
*Attorney, Agent, or Firm*—Ladas & Parry

[57] ABSTRACT

This invention discloses an improved method and apparatus for generating a screened reproduction of an image. The apparatus comprises a matrix defining an arrangement of a plurality of areas within a printing dot, each having an assigned reference value. The screening logic apparatus receives input density information with respect to an image and includes apparatus for assigning to each input density a corresponding plurality of reference values. The apparatus also includes a method for combining with each of the plurality of reference values a random additional reference value, thereby defining a randomized plurality of reference values. The apparatus also causes the exposure of those areas in the matrix having reference values which correspond to the randomized plurality of reference values.

12 Claims, 6 Drawing Sheets

SCREEN MATRIX

INPUT DENSITY = 4
BASE REFERENCE VALUE
SPAN = 0 - 3
RANDOM REFERENCE VALUE =1

INPUT DENSITY = 4
BASE REFERENCE VALUE
SPAN = 0 - 3
RANDOM REFERENCE VALUE =7

INPUT DENSITY = 4
BASE REFERENCE VALUE
SPAN = 0 - 3
RANDOM REFERENCE VALUE =13

| INPUT DENSITY | BASE REFERENCE VALUE SPAN |
|---|---|
| 0 | 0 - 3 |
| 1 | 0 - 7 |
| 2 | 0 - 11 |
| 3 | 0 - 14 |
| 4 | 0 - 17 |
| 5 | 0 - 21 |
| 6 | 0 - 25 |
| . | . |
| . | . |
| . | . |
| 120 | 0 - 483 |
| 121 | 0 - 487 |
| 122 | 0 - 491 |
| . | . |
| . | . |
| . | . |
| 250 | 0 - 1000 |
| 251 | 0 - 1004 |
| 252 | 0 - 1008 |
| 253 | 0 - 1013 |
| 254 | 0 - 1018 |
| 255 | 0 - 1023 |

APPARATUS AND METHOD FOR GENERATING HALF-TONE DOT IN IMAGE REPRODUCTION

FIELD OF THE INVENTION

The present invention relates to the recording of a half-tone picture and more particularly to a method and apparatus for electronic halftone dot generation in image reproduction.

BACKGROUND OF THE INVENTION

Electronic screening for image reproduction is well established in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded with threshold values, defining a cell memory matrix. Input digitized scanned density values of an image, such as a color separation, are compared with the threshold values, cell by cell. The results provide an on/off control input for a laser plotter.

U.S. Pat. No. 4,825,298 to Ikuta and Mural describes a technique for generating a screened reproduction of an image in which the density distribution of a given screen dot is expressed in three dimensions, wherein the area of the screen dot is expressed along X and Y axes and the density is expressed along a Z axis perpendicular thereto. A film coordinate generator generates film coordinates (u,v), corresponding to the position of an exposure beam on a recording film which position is detected by encoders. The film coordinates are in turn supplied to a screen coordinate generator to be converted into virtual screen coordinates (x,y). A beam control signal generator receives the coordinates (x,y) and an image signal corresponding to the position of the exposure beam to output a beam control signal indicating indicting lighting of the exposure beam when one of the coordinates (x,y) is between upper and lower limit values, corresponding to the same, which are previously determined for each combination of the other of the coordinates (x,y) and the density value of the image signal.

The technique of U.S. Pat. No. 4,825,298 to Ikuta and Mural has the disadvantage that its memory requirements are high.

U.K. Published Patent Application 2,157,119A to Ikuta describes apparatus which operates similarly to the technique of U.S. Pat. No. 4,456,924 but does not employ a matrix memory. Instead, the threshold function is calculated on the fly in real time or near real time. This apparatus is limited to relatively simple dot configurations.

In U.S. Pat. No. 4,918,622 there is described an electronic graphic arts screener in which a three-dimensional memory array is employed for screen dot generation.

Conventional techniques for screen dot generation, exemplified by that described in U.S. Pat. 4,456,924 represent each input density level by a screen dot of a corresponding number of dot elements. The difference between a relatively lower input density and a relatively higher input density is indicated by adding predetermined additional dot elements at predetermined locations to those dot elements at predetermined locations which represent the lower input density. Thus the set of dot elements which makes up a relatively higher input density dot always includes the subset of the dot elements which makes up a relatively lower input density dot.

SUMMARY OF THE INVENTION

The present invention seeks to provide an improved method and apparatus for generating a screened reproduction of an image.

There is thus provided in accordance with a preferred embodiment of the present invention apparatus for screening comprising:

a matrix defining an arrangement of a plurality of areas within a printing dot, each having an assigned reference value;

screening logic apparatus receiving input density information with respect to an image and including:
apparatus for assigning to each input density a corresponding plurality of reference values;
apparatus for combining with each of the plurality of reference values a random additional reference value, thereby to define a randomized plurality of reference values; and
apparatus for causing exposure of those areas in the matrix having reference values which correspond to the randomized plurality of reference values.

Preferably, the apparatus for combining comprises apparatus for adding to each of the plurality of reference values a random additional reference value.

In accordance with a preferred embodiment of the present invention the plurality of reference values comprises a span of reference values and wherein the randomized plurality of reference values comprises a range of reference values.

There is also provided in accordance with a preferred embodiment of the present invention apparatus for screening comprising:

a matrix defining an arrangement of a plurality of areas within a printing dot, each having an assigned reference value;

screening logic apparatus receiving input density information with respect to an image and including:
apparatus for assigning to each input density a corresponding plurality of reference values;
apparatus for combining with each of the plurality of reference values an additional reference value, thereby to define an offset plurality of reference values; and
apparatus for causing exposure of those areas in the matrix having reference values which correspond to the offset plurality of reference values.

There is additionally provided in accordance with a preferred embodiment of the present invention a method for screening comprising the steps of:

providing a matrix defining an arrangement of a plurality of areas within a printing dot, each having an assigned reference value;

receiving at screening logic apparatus input density information with respect to an image;

assigning to each input density a corresponding plurality of reference values;

combining with each of the plurality of reference values a random additional reference value, thereby to define a randomized plurality of reference values; and causing exposure of those areas in the matrix having reference values which correspond to the randomized plurality of reference values.

Preferably, the step of combining comprises adding to each of the plurality of reference values a random additional reference value.

In accordance with a preferred embodiment of the invention, the plurality of reference values comprises a span of reference values and wherein the randomized plurality of reference values comprises a range of reference values.

There is also provided in accordance with a preferred embodiment of the present invention a method for screening comprising the steps of:

providing a matrix defining an arrangement of a plurality of areas within a printing dot, each having an assigned reference value;

receiving at screening logic apparatus input density information with respect to an image;

assigning to each input density a corresponding plurality of reference values;

combining with each of the plurality of reference values an additional reference value, thereby to define an offset plurality of reference values; and causing exposure of those areas in the matrix having reference values which correspond to the offset plurality of reference values.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
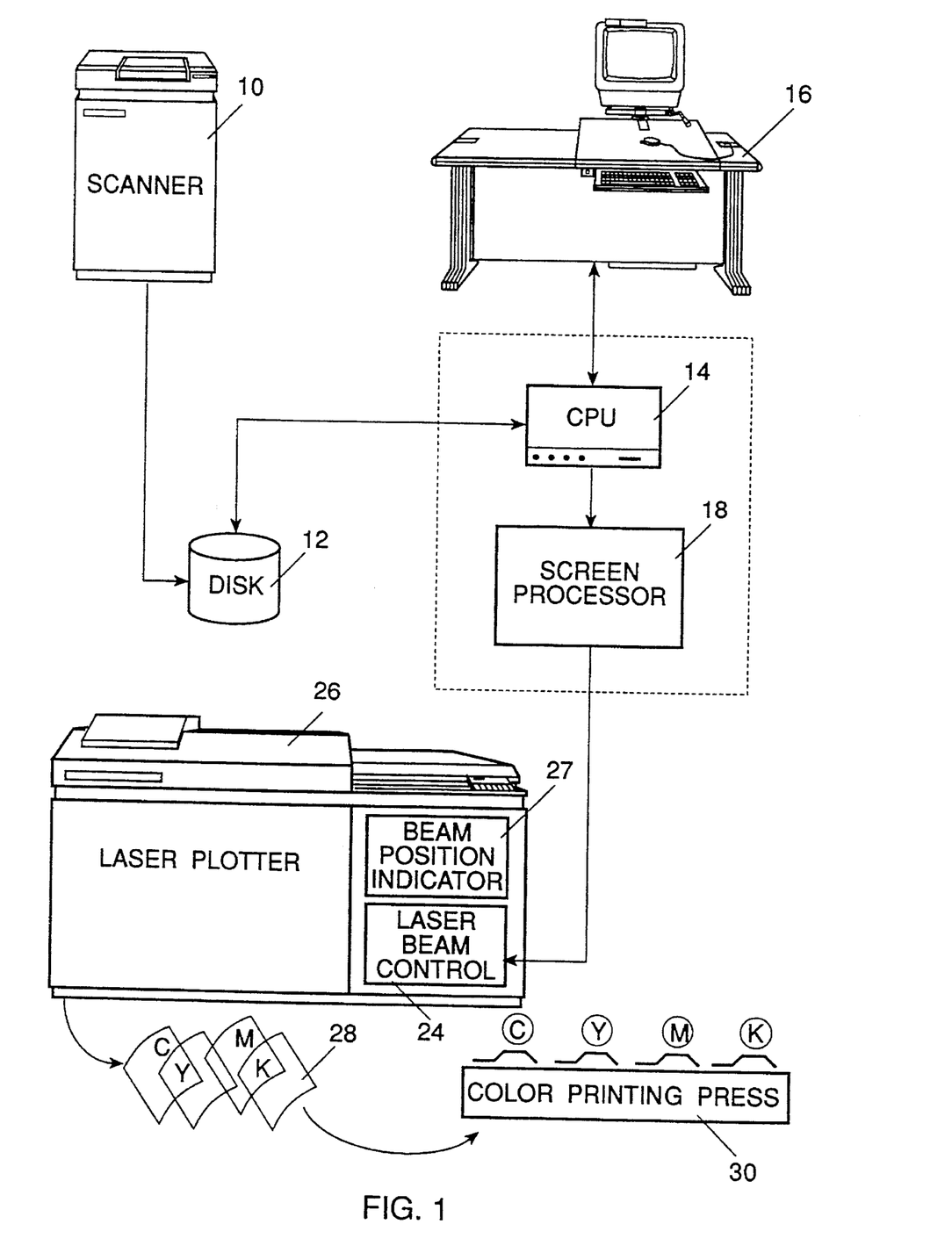
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on an image data disk 12 or any other suitable storage medium, which is accessible by a CPU 14, such as an Intel 80386. Interfacing with the CPU 14 is an interactive workstation 16, such as a Scitex Prisma, manufactured and sold by Scitex Corporation Ltd. of Herzlia, Israel.

CPU 14 also interfaces with screen processor circuitry 18 which provides a control output to laser beam control circuitry 24 in a laser plotter 26, such as a Raystar, manufactured and sold by Scitex Corporation Ltd. of Herzlia, Israel. The laser plotter 26 includes beam position indicator apparatus 27, which provides an output to screen processor 18.

Laser plotter 26 produces halftone film color separations 28 which are employed in a conventional process color printing press 30, to produce process color prints.

Screen control circuitry 18 is illustrated in greater detail in FIG. 3 and will be described hereinbelow.

Figure 2:
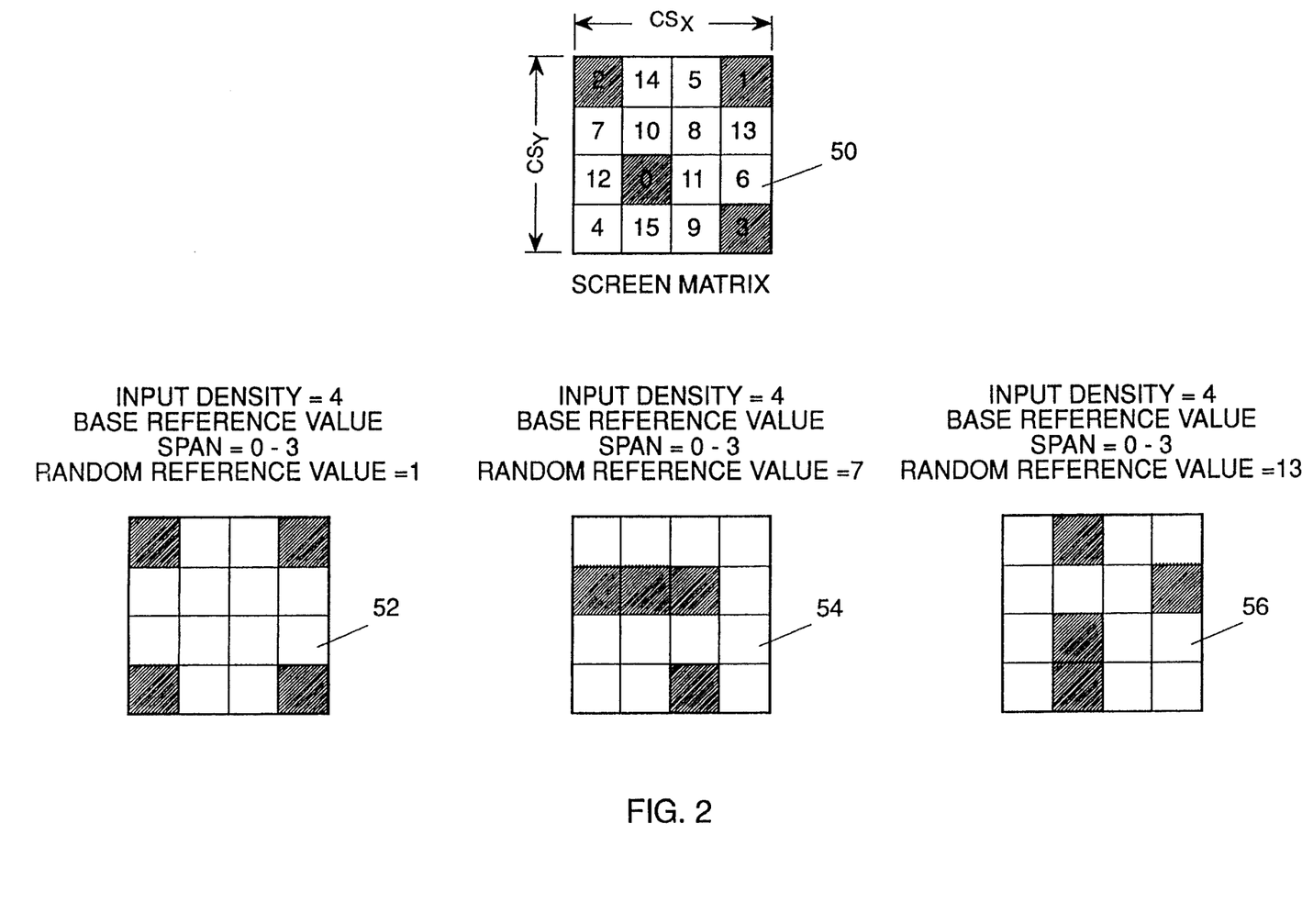
FIG. 2 is an illustration of the randomization of a printing dot for a given input density value and various different randomly generated additional reference values.

Reference is now made to FIG. 2, which conceptually illustrates a principal feature of the present invention. A matrix 50 defines the locations of a plurality of areas within an outline printing dot and assigns to each of the areas, a reference value. In the illustration, a relatively small matrix with a horizontal cell size $CS_x$ and a vertical cell size $CS_y$ both equal to 4 is shown. This matrix contains a total of 16 areas, it being appreciated that in normal use a matrix having at least 256 and preferably a greater number of areas is employed.

In the illustration, the 16 areas are assigned reference values 0 . . . 15. In the illustrated example, it is assumed throughout that the relevant input density value is 4, it being appreciated that any other suitable value could alternatively be employed. A base reference value span corresponding to an input density value of 4 is taken to be 0–3.

In accordance with a preferred embodiment of the present invention, for each printing dot to be generated, there is combined, as by addition, with the base reference value span a random additional reference value.

FIG. 2 illustrates three different printing dots 52, 54 and 56 all based on the same matrix and all representing the same input density. The three different printing dots differ from each other only in their random additional reference value. Here the three random additional reference values are taken to be 1, 7 and 13.

It is seen that for the dot 52 having a random additional reference value of 1, the base reference span of 0–3 is offset by 1 and provides a randomized reference span of 1–4. By comparing the dot 52 with the shaded areas in matrix 50, it is seen that the total amount of area exposure is identical, but the locations of the exposed areas vary.

Similarly, it is seen that for the dot 54 having a random additional reference value of 7, the base reference span of 0–3 is offset by 7 and provides a randomized reference span of 7–10. By comparing the dot 54 with the shaded areas in matrix 50 and with the dot 52, is seen that the total amount of area exposure is identical, but the locations of the exposed areas vary between the dots.

Considering now the dot 56, it is seen that it has a random additional reference value of 13 and that the base reference span of 0–3 is offset by 13 and provides a randomized reference span of 13–16. Since there does not exist an area associated with a reference value 16, and the highest reference number is 15, a carry function is invoked and the area having a reference value 0 is exposed.

By comparing the dot 56 with the shaded areas in matrix 50 and with dots 52 and 54 it is seen that the total amount of area exposure is identical in all of the dots, but the locations of the exposed areas vary.

Figure 3:
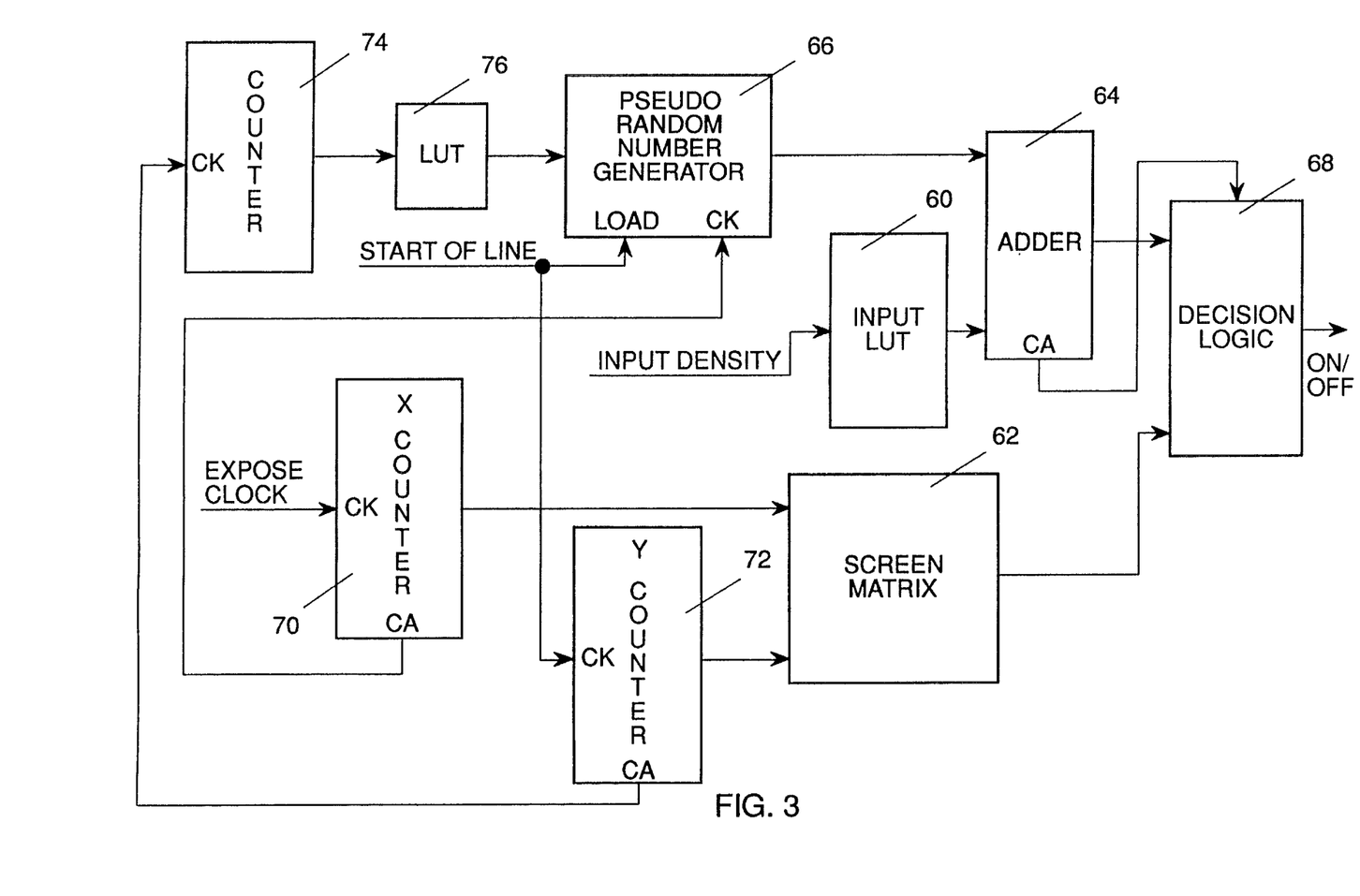
FIG. 3 is a simplified block diagram illustration of apparatus for halftone dot generation forming part of the apparatus of FIG. 1.

Reference is now made to FIG. 3, which is a simplified block diagram illustration of screen control circuitry 18 (FIG. 1) which carries out the functionality described hereinabove.

Figure 5:
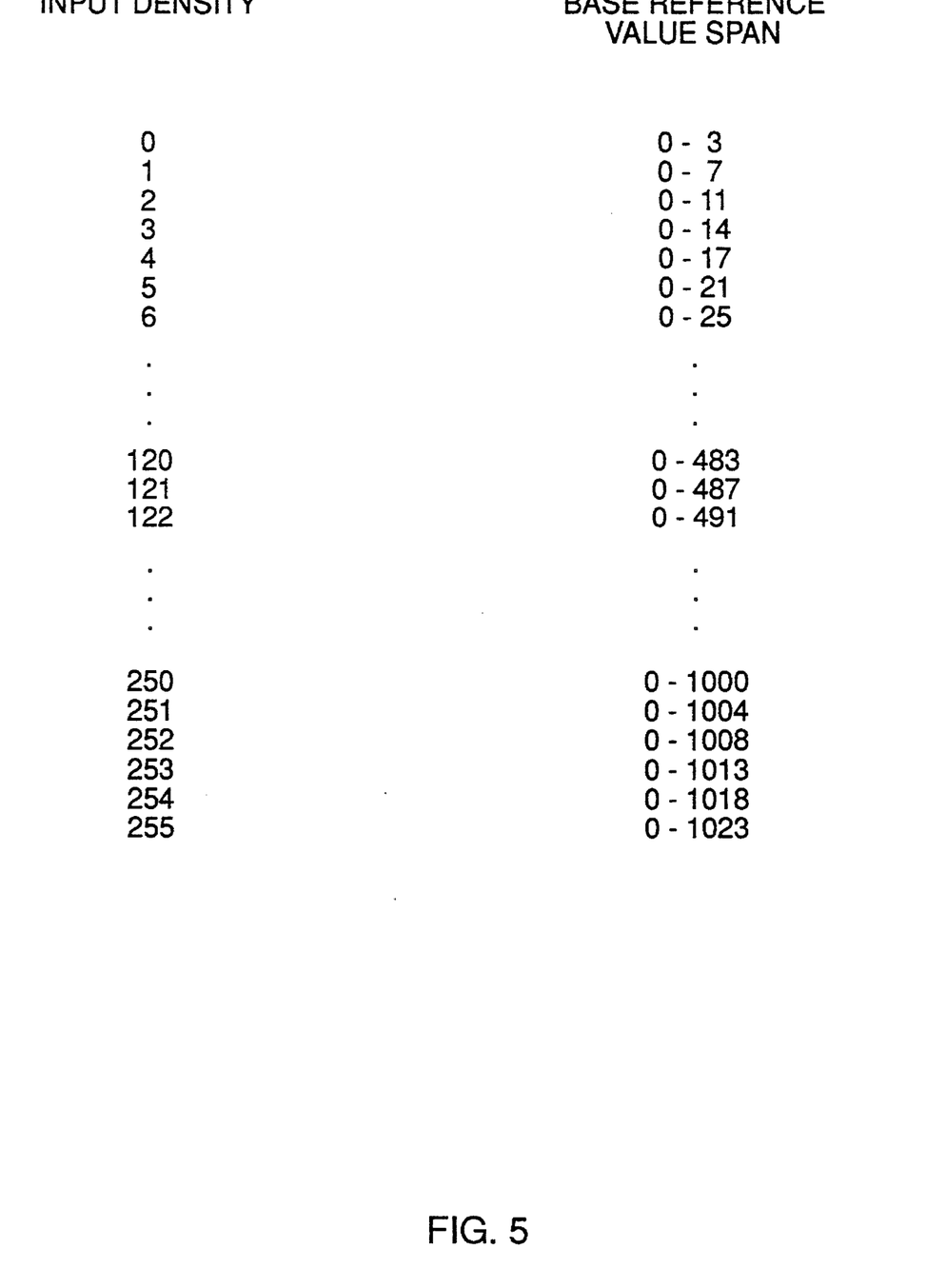
FIG. 5 is an illustration of part of an input LUT useful in the apparatus of FIG. 3.

Input density values representing an original of an image to be screened are supplied to an input LUT 60 which provides for each input density a corresponding span of base reference values, each corresponding to an area of a screen matrix 62. Alternatively, instead of a span of consecutive base reference values, any suitable plurality of non-consecutive base reference values may be provided. A typical input LUT 60 is shown in FIG. 5.

The output of input LUT 60 is supplied to an adder 64 which also receives the output of a pseudo random number generator 66, which, for the present purposes will be considered as if it provided a random number output, it being appreciated that in fact only a pseudo-random output is provided. The output of pseudo random number generator 66 constitutes a random additional reference value which is added to the span provided by LUT 60 on the basis of the input density and which operates to offset the span in a random manner.

The output of adder 64 is supplied to decision logic circuitry 68 which also receives an input from the screen matrix 62, as well as a carry input from adder 64. The decision logic circuitry 68 is operative to provide ON/OFF instructions to a laser plotter for each area of the matrix 62 in accordance with the randomized range of reference values output by adder 64. As noted above, if the randomized range exceeds the available range of reference values in the matrix 62, the carry functionality of the adder, provides a substitute reference value or substitute reference values which do correspond to areas in the matrix.

X and Y counters 70 and 72 provide addresses to screen matrix 62 and cooperate with a pseudo random number generator counter 74 and LUT 76 to cause generation of a new pseudo random number by generator 66 for each printing dot.

Figure 4A:
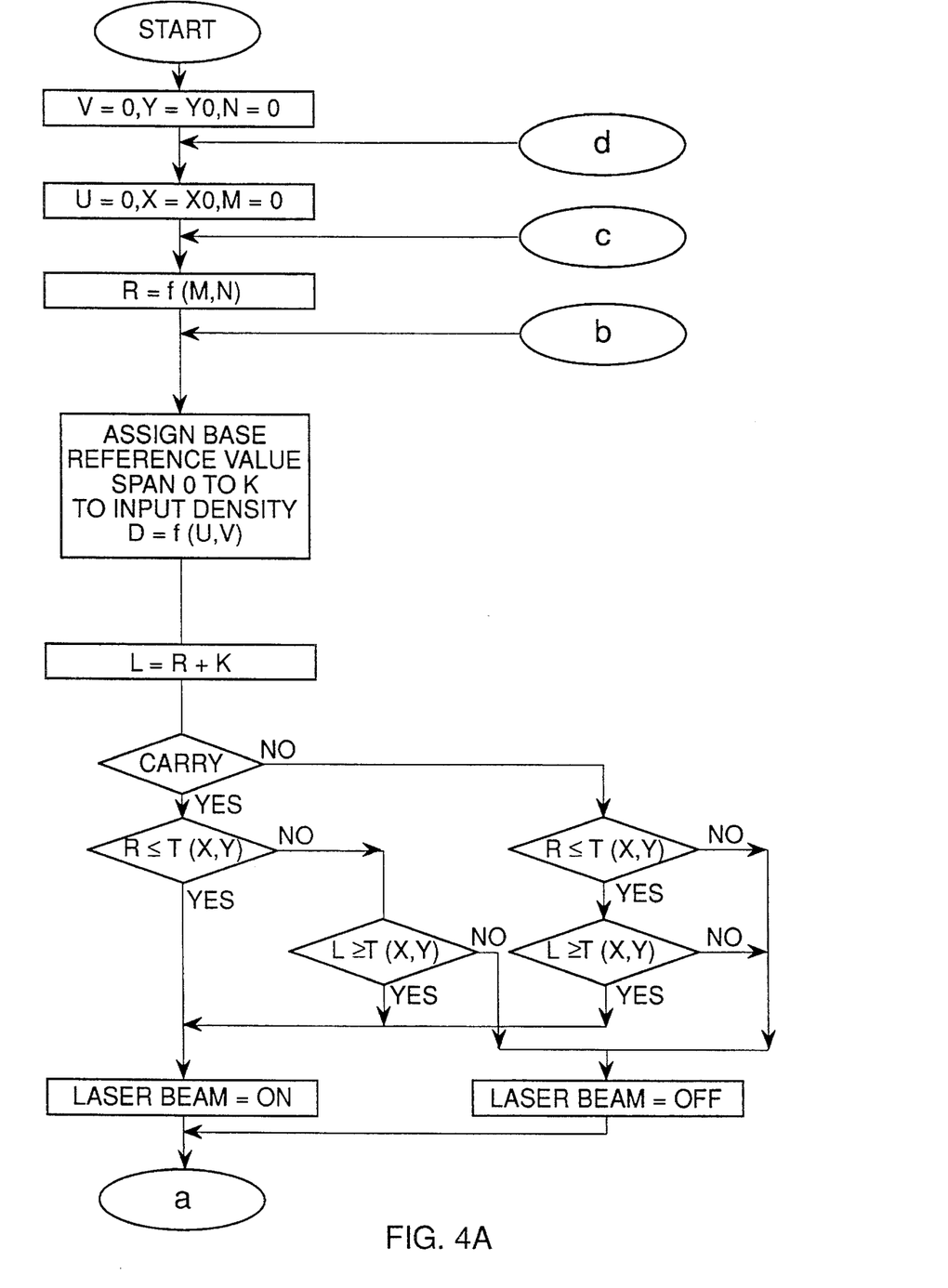
FIGS. 4A and 4B together constitute a generalized flowchart illustrating operation of the dot generation apparatus of FIG. 3 in controlling a laser plotter to produce desired printing dots.
Figure 4B:
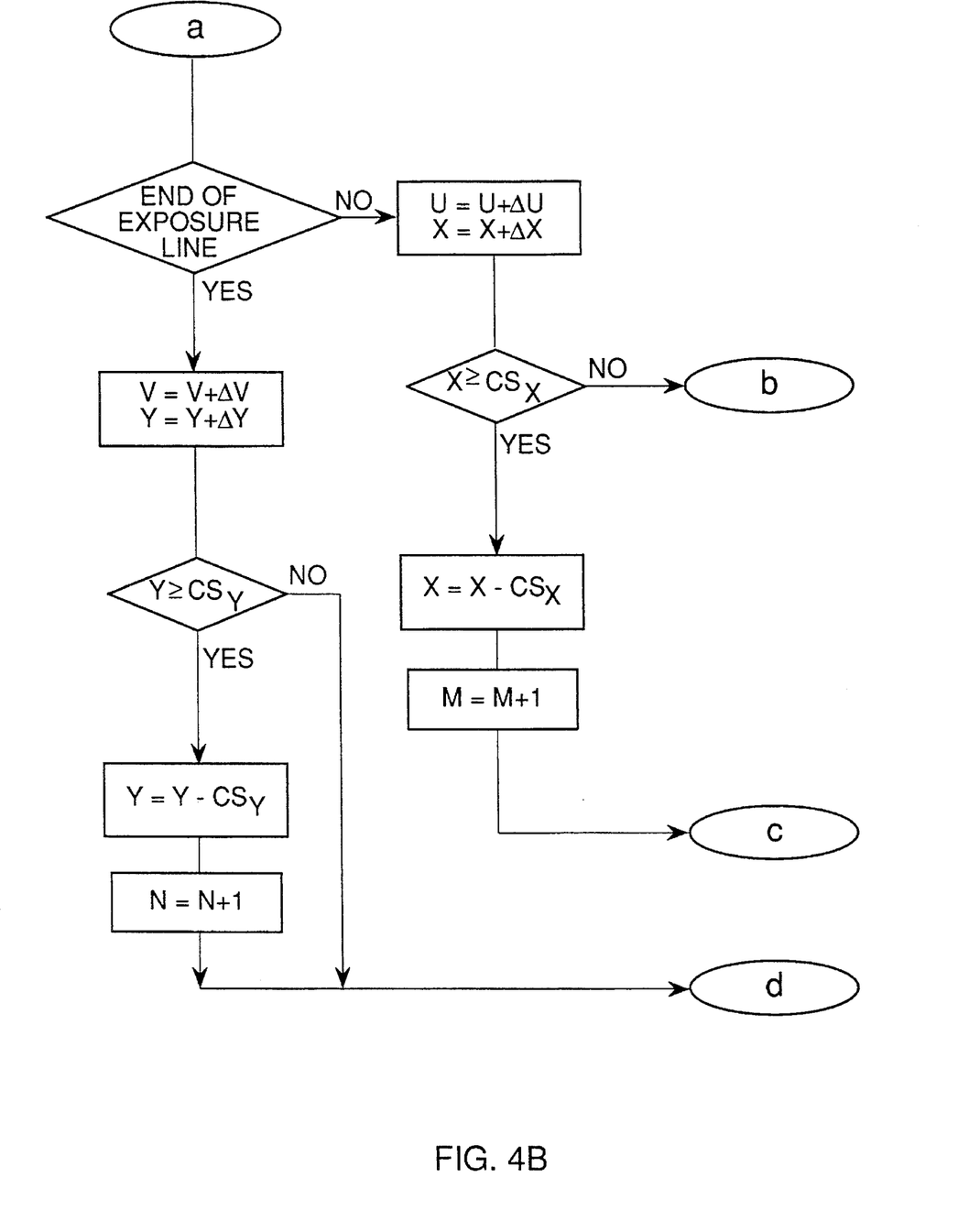

Reference is now made to FIGS. 4A and 4B, which together constitute a generalized flowchart illustrating operation of the invention. The following notation is employed in the flowchart:

D—Input density

T—Screen matrix reference value

M—Screen matrix index in horizontal direction

N—Screen matrix index in vertical direction

R—Pseudo Random Number

U—Plotter beam coordinate in scanning direction

V—Plotter beam coordinate in direction perpendicular to scanning direction

It is noted that throughout the description all reference values are represented by the limited number B of bits and the screen matrix reference values range from zero to $2^B-1$.

Initially (FIG. 4A), a value of zero is assigned to the plotter beam coordinates U,V and to the screen matrix indices N,M and values X0 and Y0 are assigned to the screen matrix memory address components X and Y respectively.

Next, a pseudo random number R is provided and a reference value span 0 to K is assigned to the input density at beam location U,V. The pseudo random number R is then added to the base reference value span, so as to obtain a randomized reference span ranging from R to L.

If the add operation does not result in a carry, the laser beam will only be in the ON state if the matrix reference value T at location X,Y lies within the randomized reference span.

If a carry has been invoked, the laser beam will only be in the ON state if T is larger than or equal to R or if T is smaller than or equal to L.

Next (FIG. 4B), the position of the laser beam is determined. If the laser beam is not at the end of an exposure line, the value of the plotter beam coordinate U in scanning direction and the screen matrix memory address component X are updated. Then, the updated screen matrix memory address component X is investigated.

If the updated X value lies within the range for which screen matrix reference values have been defined (i.e. X is smaller than the screen matrix cell size $CS_X$ in horizontal direction), a new loop is initiated from b (FIG. 4A).

If the updated X value lies outside the range for which screen matrix reference values have been defined, X is modified by subtracting from it $CS_X$ and the screen matrix index M in the horizontal direction is incremented. The loop then continues from c (FIG. 4A).

If the laser beam is at the end of an exposure line, the value of the plotter beam coordinate V in direction perpendicular to the scanning direction and the screen matrix memory address component Y are updated. Then, the updated screen matrix memory address component Y is compared with the cell size $CS_Y$ in the vertical direction.

The result of the comparison determines whether Y will be modified and the screen matrix index N in the vertical direction will be incremented. The loop then continues from d (FIG. 4A).

It will now have been appreciated how a random number can be employed to offset a plurality of reference values corresponding to an input density, so as to achieve randomly varying printing dots with the use of a screen matrix.

It will be appreciated by persons skilled in the art that the present invention is not limited by what has been particularly shown and described hereinabove. Rather the scope of the present invention is defined only by the claims which follow:

I claim:

1. Apparatus for generating a screened reproduction of an image, comprising:

a screen matrix defining an arrangement of a plurality of areas within a printing dot, each having an assigned reference value;

screening logic apparatus receiving input density information with respect to said image and including:
   means for assigning to each input density a corresponding plurality of ordered values;
   means for combining with each of said plurality of ordered values a random value, thereby to define a randomized plurality of values; and a decision logic for selectively exposing those areas in said screen matrix whose assigned reference values correspond to said randomized plurality of values, thereby generating said screened reproduction of said image.

2. Apparatus according to claim 1 and wherein said means for combining comprises means for adding to each of said plurality of reference values a random additional ordered value.

3. Apparatus according to claim 1 and wherein said plurality of ordered values comprises a span of values and wherein said randomized plurality of values comprises a range of values.

4. Apparatus according to claim 1 wherein said decision logic comprises means for comparing said randomized plurality of values with said assigned reference values and for producing output signals for those assigned reference values corresponding to said randomized plurality of values, and exposure means receiving said output signals to expose those areas of said screen matrix whose assigned reference values correspond to said randomized plurality of values.

5. Apparatus for generating a screened reproduction of an image, comprising:

a screen matrix defining an arrangement of a plurality of areas within a printing dot, each having an assigned reference value;

screening logic apparatus receiving input density information with respect to said image and including:

means for assigning to each input density a corresponding first plurality of reference values;

means for combining with each of said first plurality of reference values an additional reference value, thereby to define a second plurality of reference values; and a decision logic for selectively exposing those areas in said matrix whose assigned reference values correspond to said second plurality of reference values, thereby generating said screened reproduction of said image.

6. Apparatus according to claim 5 wherein said decision logic comprises means for comparing said second plurality of reference values with said assigned first plurality of reference values and producing output signals for those assigned first plurality of reference values corresponding to said second plurality of reference values, and exposure means receiving said output signals to expose those areas of said screen matrix whose assigned first plurality of reference values correspond to said second plurality of reference values.

7. A method for generating a screened reproduction of an image, comprising the steps of:

providing a screen matrix defining an arrangement of a plurality of areas within a printing dot, each having an assigned reference value;

receiving at screening logic apparatus input density information with respect to said image;

assigning to each input density a corresponding plurality of ordered values;

combining with each of said plurality of ordered values a random value, thereby to define a randomized plurality of values; and selectively exposing those areas in said matrix whose assigned reference values correspond to said randomized plurality of values, thereby generating said screened reproduction of said image.

8. A method according to claim 7 and wherein said step of combining comprises adding to each of said plurality of non-random values a random additional reference value.

9. A method according to claim 4 and wherein said plurality of ordered values comprises a span of values and wherein said randomized plurality of values comprises a range of values.

10. A method according to claim 7 further comprising comparing said randomized plurality of values with said assigned reference values, producing output signals for those assigned reference values corresponding to said randomized plurality of values, and affecting said selective exposuring step by receiving said output signals to expose those areas of said matrix whose assigned reference a values correspond to said randomized plurality of values.

11. A method for generating a screened reproduction of an image comprising the steps of:

providing a screen matrix defining an arrangement of a plurality of areas within a printing dot, each having an assigned reference value;

receiving at screening logic apparatus input density information with respect to said image;

assigning to each input density a corresponding first plurality of reference values;

combining with each of said first plurality of reference values an additional reference value, thereby to define a second plurality of reference values; and selectively exposing those areas in said matrix whose assigned reference values correspond to said second plurality of reference values, thereby generating said screened reproduction of said image.

12. A method according to claim 11 further comprising comparing said second plurality of reference values with said assigned first plurality of reference values, producing output signals for those assigned first plurality of reference values corresponding to said second plurality of reference value, and effecting said selective exposuring step by receiving said output signals to expose those areas of said matrix whose assigned first plurality of reference values correspond to said second plurality of reference values.

* * * * *